US011216150B2

(12) United States Patent
Lee

(10) Patent No.: US 11,216,150 B2
(45) Date of Patent: Jan. 4, 2022

(54) PERVASIVE 3D GRAPHICAL USER INTERFACE WITH VECTOR FIELD FUNCTIONALITY

(71) Applicant: Wen-Chieh Geoffrey Lee, Taipei (TW)

(72) Inventor: Wen-Chieh Geoffrey Lee, Taipei (TW)

( * ) Notice: Subject to any disclaimer, the term of this patent is extended or adjusted under 35 U.S.C. 154(b) by 0 days.

(21) Appl. No.: 16/456,009

(22) Filed: Jun. 28, 2019

(65) Prior Publication Data

US 2020/0409528 A1    Dec. 31, 2020

(51) Int. Cl.

| | |
|---|---|
| *G06F 3/0481* | (2013.01) |
| *G06F 3/0354* | (2013.01) |
| *G06F 3/0484* | (2013.01) |
| *G06T 19/00* | (2011.01) |
| *G06N 3/08* | (2006.01) |
| *G06F 3/0346* | (2013.01) |
| *G06F 3/0489* | (2013.01) |

(52) U.S. Cl.
CPC ........ *G06F 3/04815* (2013.01); *G06F 3/0346* (2013.01); *G06F 3/03543* (2013.01); *G06F 3/04845* (2013.01); *G06N 3/08* (2013.01); *G06T 19/003* (2013.01); *G06F 3/0489* (2013.01); *G06T 2210/24* (2013.01); *G06T 2210/41* (2013.01)

(58) Field of Classification Search
CPC .............. G06F 3/04815; G06F 3/0346; G06F 3/03543; G06F 3/04845
See application file for complete search history.

(56) References Cited

U.S. PATENT DOCUMENTS

| | | | |
|---|---|---|---|
| 4,835,528 | A | 5/1989 | Flinchbaugh |
| 5,798,761 | A | 8/1998 | Isaacs |
| 5,825,945 | A | 10/1998 | Stolis et al. |
| 6,078,312 | A | 6/2000 | Liebenow |
| 6,392,632 | B1 | 5/2002 | Lee |

(Continued)

FOREIGN PATENT DOCUMENTS

| | | |
|---|---|---|
| EP | 1 113 385 | 7/2001 |
| EP | 1 473 623 | 11/2004 |

(Continued)

OTHER PUBLICATIONS

U.S. Office Action, U.S. Appl. No. 16/164,928, Applicant: Wen-Chieh Geoffrey Lee, dated May 14, 2020, 22 pages.

(Continued)

*Primary Examiner* — Sarah Lhymn
(74) *Attorney, Agent, or Firm* — Saile Ackerman LLC; Stephen B. Ackerman

(57) ABSTRACT

A three-dimensional graphical user interface (3D GUI) configured to be used by a computer, a display system, an electronic system, or an electro-mechanical system. The 3D GUI provides an enhanced user-engaging experience while enabling a user to manipulate the motion of an object of arbitrary size and a multiplicity of independent degrees of freedom, using sufficient degrees of freedom to represent the motion. The 3D GUI is configured to process the kinematics of objects interacting with vector fields by using the analytics of Stokes' law. The 3D GUI is also configured to process distributed neural networks by methods including combining the actions of individual nodes and storing the result as a T matrix product in a central cluster node.

20 Claims, 5 Drawing Sheets

(56) References Cited

U.S. PATENT DOCUMENTS

Figure 3A:
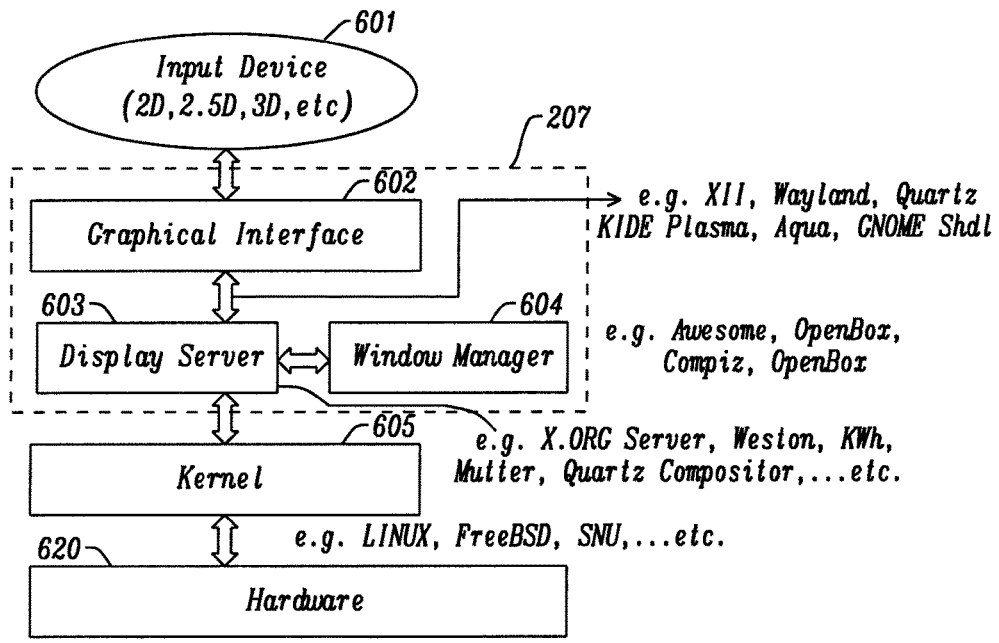

| | | |
|---|---|---|
| 6,697,053 B2 | 2/2004 | Kajihara |
| 6,720,949 B1 | 4/2004 | Pryor et al. |
| 6,844,871 B1 | 1/2005 | Hinckley et al. |
| 7,019,733 B2 | 3/2006 | Koay |
| 7,081,612 B1 | 7/2006 | Lu |
| 7,161,682 B2 | 1/2007 | Xie et al. |
| 7,301,531 B2 | 11/2007 | Wu |
| 7,321,359 B2 | 1/2008 | Xie et al. |
| 7,355,160 B2 | 4/2008 | Cheah et al. |
| 7,439,954 B2 | 10/2008 | Theytaz et al. |
| 7,656,395 B2 | 2/2010 | Pope et al. |
| 7,872,639 B2 | 1/2011 | Theytaz et al. |
| 7,924,266 B2 | 4/2011 | Larsen |
| 8,077,147 B2 | 12/2011 | Krah et al. |
| 8,279,279 B2 | 10/2012 | Hattori et al. |
| 8,291,322 B2 | 10/2012 | Klappert et al. |
| 8,527,896 B2 | 9/2013 | Matthews et al. |
| 8,553,235 B1 | 10/2013 | Lee |
| 8,736,561 B2 | 5/2014 | Anzures et al. |
| 8,954,887 B1 | 2/2015 | Tseng et al. |
| 9,189,254 B2 | 11/2015 | Kushman et al. |
| 9,405,430 B2 | 8/2016 | Ullmann |
| 9,690,446 B2 | 6/2017 | Forstall et al. |
| 9,703,396 B2 | 7/2017 | Lee |
| 9,720,525 B2 | 8/2017 | Lee |
| 9,733,727 B2 | 8/2017 | Lee |
| 9,830,042 B2 * | 11/2017 | Ludwig ............... G06F 3/04815 |
| 9,904,874 B2 | 2/2018 | Shoaib et al. |
| 10,492,981 B1 * | 12/2019 | Kumar .................... G06F 3/167 |
| 2004/0088289 A1 | 5/2004 | Xu |
| 2006/0066572 A1 | 3/2006 | Yumoto et al. |
| 2006/0132443 A1 | 6/2006 | Wu |
| 2008/0036773 A1 | 2/2008 | Bae |
| 2009/0102793 A1 | 4/2009 | Bohn et al. |
| 2009/0153486 A1 | 6/2009 | Bohn |
| 2009/0160772 A1 | 6/2009 | DePue et al. |
| 2009/0262071 A1 | 10/2009 | Yoshida |
| 2010/0001950 A1 | 1/2010 | Fouquet et al. |
| 2010/0036393 A1 | 2/2010 | Unsworth |
| 2010/0261526 A1 | 10/2010 | Anderson |
| 2011/0234815 A1 | 9/2011 | Zahnert et al. |
| 2011/0304541 A1 | 12/2011 | Dalal |
| 2013/0002555 A1 | 1/2013 | Lee |
| 2013/0241835 A1 | 9/2013 | Lee |
| 2014/0201670 A1 | 7/2014 | Mallya et al. |
| 2014/0343906 A1 * | 11/2014 | Yagi ........................ A61F 2/82 703/2 |
| 2014/0354548 A1 | 12/2014 | Lee |
| 2015/0127031 A1 | 5/2015 | Yagi et al. |
| 2015/0317792 A1 | 11/2015 | Wiemker et al. |
| 2016/0059412 A1 | 3/2016 | Oleynik |
| 2017/0024877 A1 * | 1/2017 | Versace .................... G01S 7/41 |
| 2017/0076194 A1 | 3/2017 | Versace |
| 2017/0103584 A1 | 4/2017 | Vats |
| 2017/0262995 A1 * | 9/2017 | Li ........................ G06N 3/0454 |
| 2017/0299676 A1 | 10/2017 | Anderson et al. |
| 2017/0312614 A1 * | 11/2017 | Tran ........................ A61B 5/11 |
| 2017/0323481 A1 * | 11/2017 | Tran ........................ G06F 19/00 |
| 2018/0068463 A1 * | 3/2018 | Risser .................. G06T 11/001 |
| 2018/0082119 A1 | 3/2018 | Zilberman |
| 2019/0138194 A1 * | 5/2019 | Ryan ................... G06F 16/958 |
| 2019/0333210 A1 * | 10/2019 | Mihalef .................. A61B 8/06 |
| 2019/0388182 A1 * | 12/2019 | Kumar ..................... G06T 7/33 |
| 2020/0134362 A1 * | 4/2020 | Luo ..................... G06K 9/6256 |
| 2020/0196984 A1 * | 6/2020 | Sprung ................ A61B 8/4245 |

FOREIGN PATENT DOCUMENTS

| | | |
|---|---|---|
| EP | 1 804 154 | 7/2007 |
| WO | WO 2006/053271 | 5/2006 |
| WO | WO 2006/137077 | 12/2006 |
| WO | WO 2011/028620 | 3/2011 |

OTHER PUBLICATIONS

Photonics Rules of Thumb, Optics, Electro-Optics, Fiber Optics, and Lasers, by John Lester Miller & ED Friedman, McGraw-Hill Copyright 1996, ISBN 0-07-044329-7, pp. 297-298 and pp. 306-307.

Optics, Fourth Edition, International Edition, by Eugene Hecht, Adelphi University, Copyright 2002, Pearson Education Inc., Chapter 4, 11 pgs.

"Capacitive Proximity Sensing Using the FDC1004," by David Wang, Texas Instruments, Application Report SNOA928—Mar. 2015, 9 pgs.

"Determining Shape and Reflectance of Lambertian, Specular, and Hybrid Surfaces using Extended Sources," by Shree K. Nayar et al., International Workshop on Industrial Applications of Machine Intelligence and Vision (MIV-89), Tokyo, Apr. 10-12, 1989, pp. 169-175.

Labshpere, A Halma Company, Technical Guide, Reflectance Materials and Coatings, North Sutton, NH 03260 USA, Jan. 1, 1991, 25 pgs.

"Xerox PARC Develops Hyperspectral Imager," by Vladimir Koifman, Image Sensors World, Oct. 27, 2015, 4 pgs., http://image-sensors-world.blogspot.tw/2015/10/xerox-parc-develops-hyperspectral-imager.html.

European Search Report, Application No. 13368043.9—1972 / 2741179, Applicant: Wen-Chieh, Geoffrey Lee, dated Mar. 31, 2015, 11 pgs.

"About BlueTrack Technology," Bluetrack Technology in a Computer Mouse/Microsoft Hardware, pp. 1-3, found: http://www.microsoft.com/hardware/en-US/bluetrack-technology, Sep. 14, 2011.

"Metamerism (color)," from Wikipedia, the free encyclopedia, pp. 1-4, http://en.wikipedia.org/wiki/Metamerism_(color), Jul. 14, 2011.

European Search Report, Application: No. 13 368 011.6—1959, Applicant: Wen-Chieh, Geoffrey Lee, dated Nov. 8, 2016, 7 pgs.

"Hyperspectral imaging with a liquid crystal polarization interferometer," by Alex Hegyi et al., Copyright 2015 Optical Society of America, 13 pgs., Optics Express vol. 23, Issue 22, pp. 28742-28754 (2015), https://doi.org/10.1364/OE.23.028742.

"Ink-Paper Interaction, A study in ink-jet color reproduction," Linkoping Studies in Science and Technology Dissertations No. 806, by Li Yang, Apr. 2003, Linkoping University, Sweden, pp. 13 and 14, ISBN 91-7373-613-9.

"Sensing angular change through a small optical window," by Tim Poston et al., May 29, 2006, pp. 1-18, found: www.mit.edu/~srimano/papers/3DoFSensing.pdf.

"Sensing Linear and Angular Change Through a Small Optical Window," by Tim Poston et al., pp. 1-9, found Oct. 3, 2013, htp://www.mit.edu/~srimano/research/mushaca/SLA.htm.

Principles of Color Technology, Third Edition, by Roy S. Berns, John Wiley & Sons, Inc, New York, pp. 56-57, Copyright 2000.

Partial European Search Report, Application No. EP 14 36 8025, Search dated Feb. 27, 2015, Munich, 4 pages.

"Inside the Trackpad: a BlackBerry Science Lesson," Inside BlackBerry, The Offical BlackBerr Blog, found: BlackBerryBlog #Five TipFriday: #BlackBerry social, Dec. 18, 2009, 2 pgs.

"HTC Touch Diamond vs. Samsung i900 Omnia: Head-to-Head," HTC Status, found: http://www.gsmarena.com/htc_touch_diamond_vs_samsung_i900_om . . . Jul. 2, 2008, 2 pgs.

"Brace yourself for the era of the 'fingermouse'," by Stephen Shankland, Deep Tech—CNET News, pp. 1-4, Mar. 25, 2010, found: http://news.cnet.com/8301-30685_3-20001191-264.html.

"Samsung Launches Optical Joystick Phone," by Allen Tsai, Dec. 20, 2006, found: http://www.mobiledia.com/news/54829.html, pp. 1-4.

"Review of CMOS image sensor," by M. Bigas, et al., Microelectronics Journal 37, Sep. 6, 2005, pp. 433-451, www.elsevier.com/locate/mejo.

"CMOS Image Sensor for High Speed Applications," by Munir El-Desouki, et al., Sensors, Jan. 13, 2009, pp. 430-444, doi: 10.3390/s90100430, www.mdpi.com/journal/sensors, ISSN 1424-8220.

"TwistMouse for Simultaneous Translation and Rotation," by Jacqui Hannagan, A dissertation submitted for the partial fultulment of the

(56) References Cited

OTHER PUBLICATIONS requirements for the degree of Bachelor of Commerce (Honours), at the University of Otago, Dunedin, New Zealand, Nov. 14, 2007, pp. 1-117.
"Visualization of multidimensional and multimodal tomographic medical imaging data, a case study," by Yan Zhang et al., Philosophical Transactions of the Royal Society A, (2009) 367, Aug. 13, 2009, pp. 3121-3148.
U.S. Office Action, U.S. Appl. No. 16/164,928, Applicant: Wen-Chieh Geoffrey Lee, dated Oct. 28, 2020, 9 pages.
U.S. Office Action, U.S. Appl. No. 16/056,752, Applicant: Lee, Wen-Chieh Geoffrey, dated Dec. 18, 2020, 72 pages.
U.S. Notice of Allowance, U.S. Appl. No. 16/164,928, Applicant: Wen-Chieh Geoffrey Lee, dated Aug. 3, 2021, 13 pages.

* cited by examiner

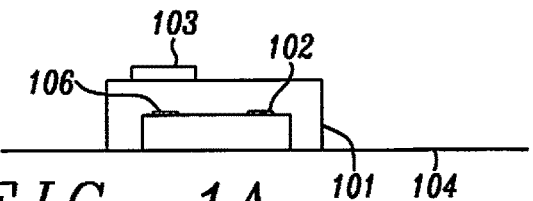
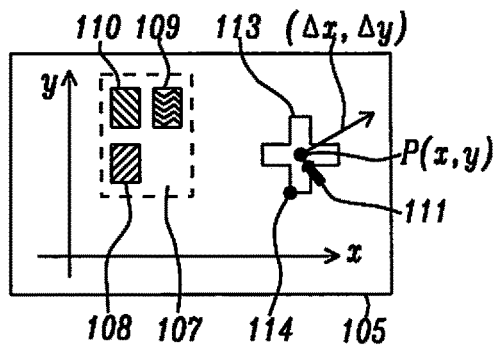
FIG. 1A
Prior Art
FIG. 1B
Prior Art
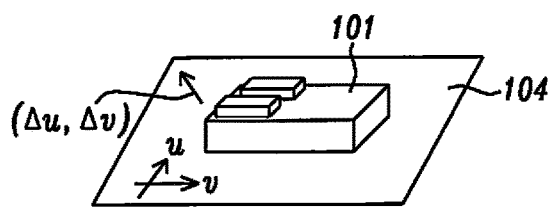
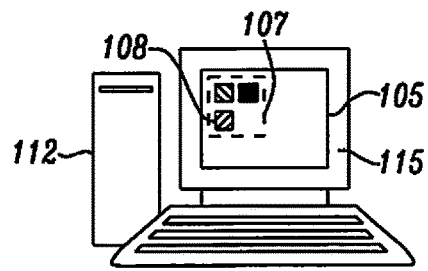
FIG. 1C
Prior Art
FIG. 1D
Prior Art
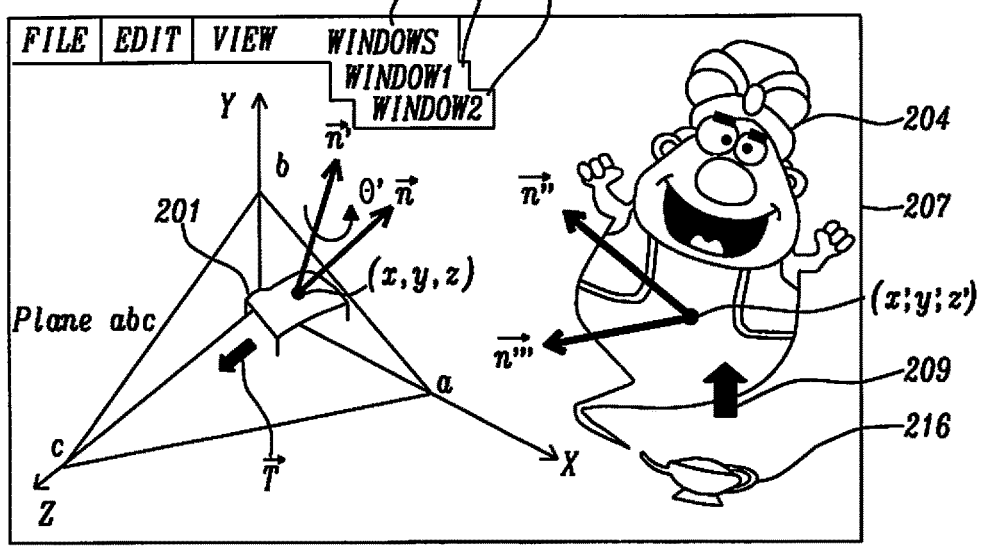
FIG. 2A
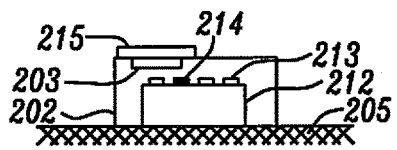
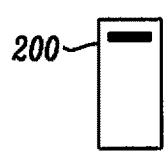
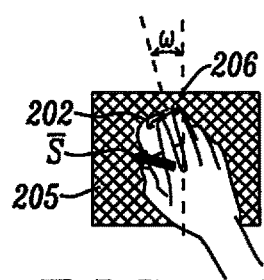
FIG. 2B   FIG. 2C   FIG. 2D

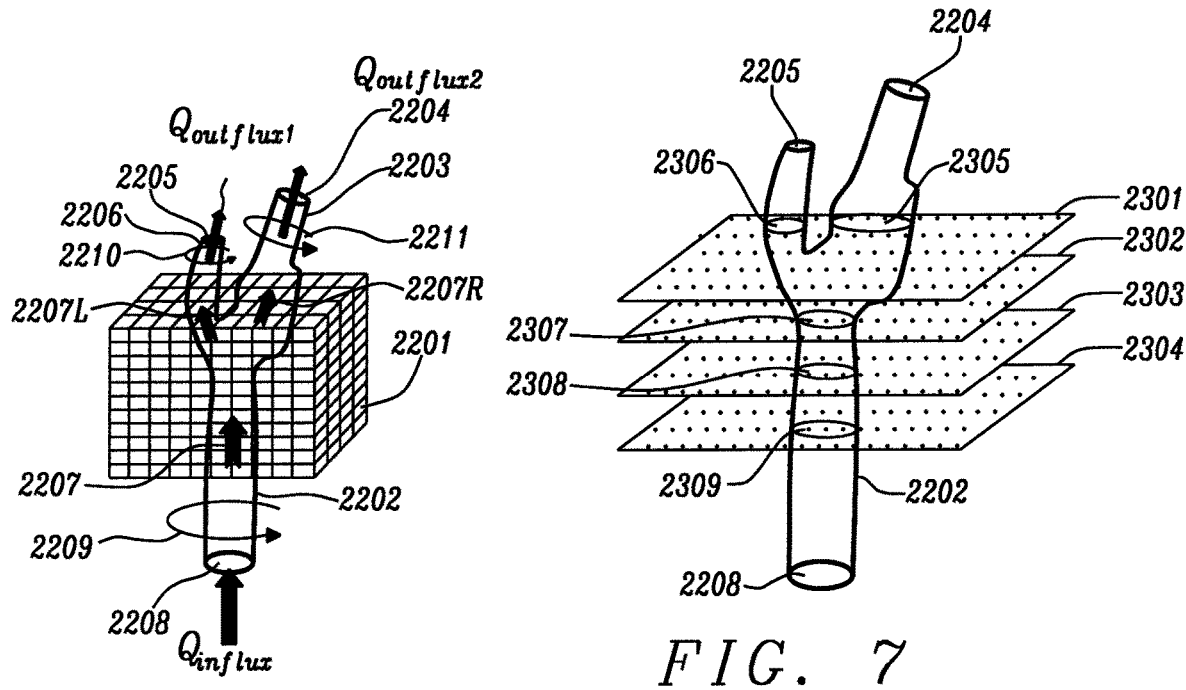
FIG. 6
FIG. 7
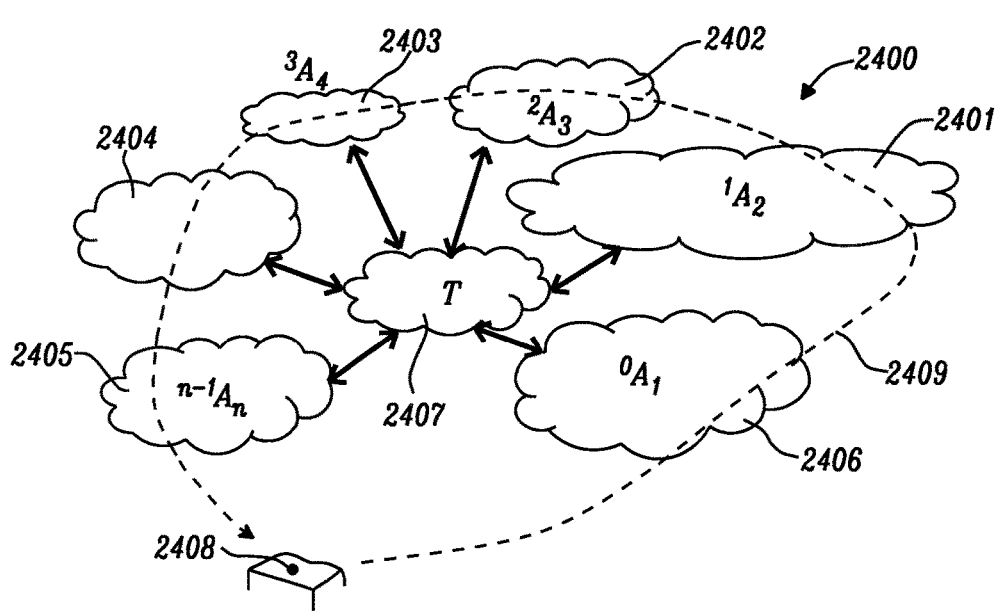
FIG. 8

PERVASIVE 3D GRAPHICAL USER INTERFACE WITH VECTOR FIELD FUNCTIONALITY

1. RELATED APPLICATIONS

The present disclosure relates the following US patent applications and US patents, all of which are owned by the owner of the instant application, and all of which are incorporated by reference in their entirety: U.S. Pat. No. 9,720,525, filed on May 29, 2012, Ser. No. 13/834,085, filed on Mar. 15, 2013, U.S. Pat. No. 9,733,727, filed on Oct. 17, 2013, Ser. No. 14/294,369, filed on Jun. 3, 2014, U.S. Pat. No. 9,703,396, filed on Jul. 12, 2013, Ser. No. 16/056,752, filed on Aug. 7, 2018, and Ser. No. 16/164,928, filed on Oct. 19, 2018.

2. TECHNICAL FIELD

The present disclosure relates to a three-dimensional graphical user interface (3D GUI) for a computer, an electronic display, a control system or an electro-mechanical system. The 3D GUI provides an absolute address and linear and non-linear motion vectors for describing the motion of a 3-dimensional (3D) object with at least three independent degrees of freedom and moving in accord with three-dimensional kinematics and visualized in a graphic rendering device.

3. BACKGROUND

A Graphical User Interface (GUI) generally denotes a software module embedded in an electronic system such as a computer or, more specifically, in its operating system, or embedded in a cloud of servers. The ultimate object of the GUI is to enable its user to engage with the graphical features presented in a displaying device associated with the electronic system, such as icons, menu bars, title bars or ribbons. A GUI can not only provide these graphical features to a user, but it can also provide the user with access to non-graphical functionalities, such as audio, speech recognition, fingerprint reading, intelligent agents, robotic manipulation, the use of advanced techniques of analysis such as machine learning or neural networks, the use of automated functions such as turning an electronic device on or off, or even surveying the habits/desires of a user. We consider a well designed GUI to be one that engages its user(s) relatively easily, initiating many intuitive/direct interactions. For decades, the GUI of a computer has been in 2D format (e.g. its icons, cursors, etc., are all in 2D format). With the arrival of the era of 3D digital graphics, there has been a corresponding need for the electronics industry to develop a user-engaging type of 3D GUI, allowing for new features such as performing a stent implantation in a cardiovascular lumen while maintaining the condition of a shear stress wall (i.e., a vector field) in a proactive manner, maneuvering a character in a 3D cartoon, or manipulating a robot following the instruction of the user, all in an intuitive, direct, real-time, and intelligent manner. The prior arts disclose many approaches to improving the design and versatility of GUI's, but these efforts do not provide the capabilities to be presented herein. For example, Ullman (U.S. Pat. No. 9,405,430) discloses a GUI that includes a menu tree to reduce the distance that a cursor has to move during an instruction selecting process. Anzures (U.S. Pat. No. 8,736,561) discloses a method of adjusting properties, content or context of a graphical object. Tseng (U.S. Pat. No. 8,954,887) discloses a GUI that pops-up a new window when a touch-sensitive screen is pressed for an extended period of time. Kushman (U.S. Pat. No. 9,189,254) discloses an automated tool that can interact with a plurality of users on web server through the use of a GUI by each user. Fostall (U.S. Pat. No. 9,690,446) discloses a plurality of profiles of finger gestures that are detected by a touch-sensitive display panel to make the use of a GUI more intuitive. Matthews (U.S. Pat. No. 8,527,896) discloses a GUI having an icon that can be made to visually hover over other icons so that the user is informed that the position of his cursor is over that icon. Mohammed (U.S. Pat. No. 9,904,874) discloses a neural network system that provides a time-domain-to-frequency-domain converter for the input signals prior to extracting features from the input signals as a means of reducing the loading on the processors of the neural network system. Yogisha (US2014/0201670) discloses a method for a computer operator to manipulate the contour of a deformation vector field derived by comparing two images taken on a moving target (e.g. the computed tomography (CT) of a soft-tissue organ). Rafael (US 2015/0317792) disclosed a computer aided identifying process that determines a region of interest (ROI) in a tissue by comparing an as-measured image to the template ones (e.g. a 3D CT of lung). Takanobu (US 2015/0127031) discloses a surgical treatment simulation program that assesses the performance of a specific treatment (e.g. stent implantation), wherein the blood flowing condition of a blood vessel such as a vascular lumen (namely an ROI) can be modified, within said vascular lumen a plurality of vector fields such as shear stress of the wall, pressure and flow velocity of the blood, etc., are simulated to evaluate their respective influences on the result of said specific treatment.

FIG. 1D schematically shows a conventional two-dimensional (2D) graphical displaying device (115) such as a monitor. FIG. 1D also shows that the GUI (105) that is applied to the displaying device (115) is also a 2D GUI. Correspondingly, as FIG. 1D further shows, the formats of the graphical features (e.g. icon 108) within that GUI (105) are also in a 2D format. Based on this 2D design correspondence, the motion vector provided by the conventional navigational device (such as a mouse) shown in FIG. 1A (101) is in 2D format as well, as further shown in FIG. 1C. During operation, a user moves a navigational device (101), such as a mouse, on a two-dimensional (2D) planar reference surface, such as a mouse pad or a desktop surface (104). The mouse (101) compares a series of images of the surface captured by its image sensor (102) as it moves along the reference plane (104) and sends relative motion vectors to the electronic system or to a cloud of servers (i.e., a plurality of servers linked by a network, such as the internet, or a means of equivalent effect). Upon the receipt of the motion vector data by the computer shown in FIG. 1D (112), the cursor, shown as (111) in FIG. 1B, will be moved on the 2D GUI (105) accordingly. In further detail, as FIG. 1C shows, when the mouse (101) is moved on a mouse pad or a desktop surface (104) by a 2D motion vector with components ($\Delta u$, $\Delta v$), it creates a corresponding positional motion vector ($\Delta x$, $\Delta y$) of the cursor (111) that appears on the 2D GUI (105). When a conventional 2D navigational device (101) is used by a 3D GUI, such as the one that will be described herein and which is pictured schematically for reference hereinafter as (207) in FIG. 2A, it will encounter several technological challenges: first, a significant amount of CPU (central processing unit) or GPU (graphic processing unit) power will be consumed by the matrix (i.e., array, tensor) transformation process for the 2D mouse data that are intended to be converted to 3D format for the subsequent use by the 3D GUI. Secondly, perhaps even more importantly, the conventional 2D mouse (101) cannot provide the angular displacement data for a 3D GUI. Lastly, there is a vital limitation on the conventional 2D navigational device, i.e., it lacks a comprehensive means to provide the depth value (Z); without such a vital capability a computer cannot designate a arbitrary shape of 3D ROI in a GUI to perform a concentrated, user engaging process (e.g. evaluating the influence of a plurality of vector fields in said ROI), making the outcome of said process (e.g. a medical diagnosis) more easily to be predicted by the artificial intelligence features.

4. SUMMARY

To address the shortcomings cited above, it is the object of the present disclosure to provide a "pervasive" (i.e., comprehensive and fully integrated) 3-dimensional graphical user interface (3D GUI) for a computer, electronic control system, or electro-mechanical system that enhances the user's engagement experience by allowing the user to manipulate the motions of an object by sufficient degrees of freedom, regardless of its size, e.g. from an object as small as that of a pixel to one that is as large as a network of computers, which can be dealt with as a distributed neural network.

To achieve the above objects, the present disclosure will provide a three-dimensional (3D) graphical user interface (3D GUI) for a computer, electronic control system, or electro-mechanical system that, by providing absolute addresses and linear and non-linear motion vectors for a 3D object, enables a user to gain an extraordinary and "transparent" experience of engaging directly with the 3D object presented therein so that there is no conscious experience that a GUI is being used. Further, when providing input to the 3D GUI by using the high resolution and high sensitivity 3D navigational device (202), whose functionality is fully disclosed by Ser. No. 14/294,369 which is fully incorporated herein by reference and will be further discussed below, the presently disclosed 3D GUI will provide its fullest capabilities and advantages. It will then be able to provide an absolute address for an object and the positional accuracy of that object will be kept constant during the entirety of its motion, instead of the accuracy of the motion continually deteriorating as a result of successive approximations. This motional accuracy is a result of the 3D navigational device being moved on a specially tinted reference surface. Still further, the presently disclosed 3D GUI uses a 2.5D coordinate system (a 2D system with a separate rotational axis) to help the user learn by interacting with 3D scenery, i.e., renderings that are created using 3D vector graphics. By manipulating a perspective angle by moving a world space camera by linear and non-linear motion vectors in six degrees of freedom, the presently disclosed 3D GUI is able to classify a plurality of 3D graphical vectors into several classes, i.e., the basic graphical entities that are used to construct the 3D vector graphics and/or 3D motion vectors selected for denoting the levels of user engagement. Finally, the present disclosure will show how the 3D GUI can be provided with the capability of describing the effects of continuous 3D vector fields on the kinematics of physical objects and of dealing with distributed neural networks.

5. BRIEF DESCRIPTION OF DRAWINGS

Figure 3B:
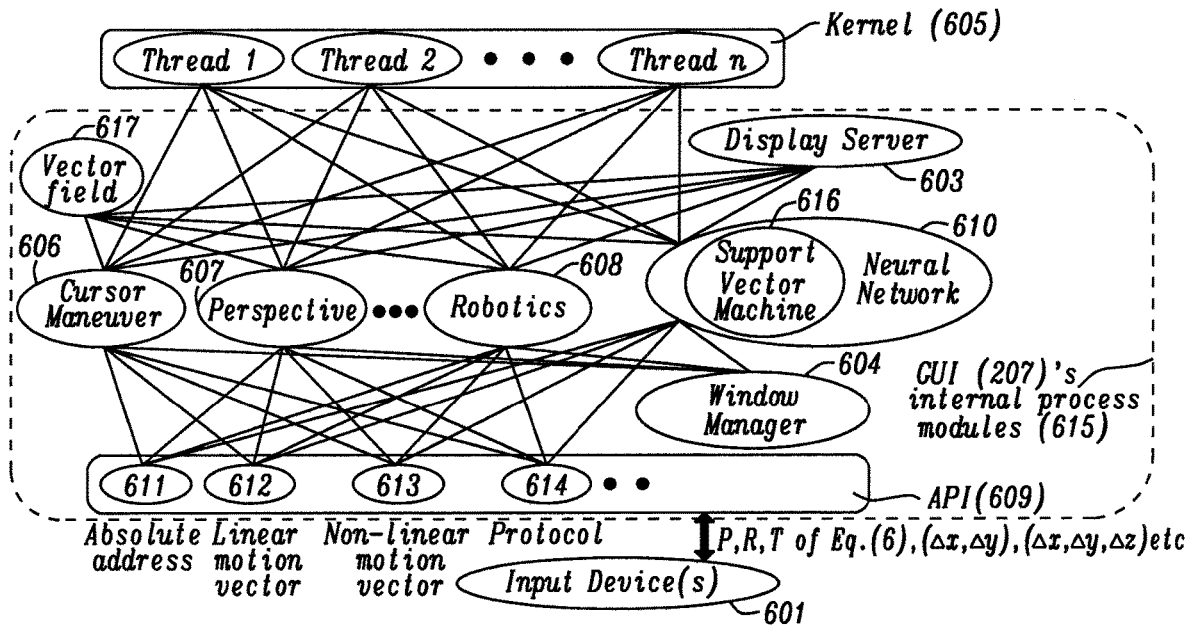
Figure 3C:
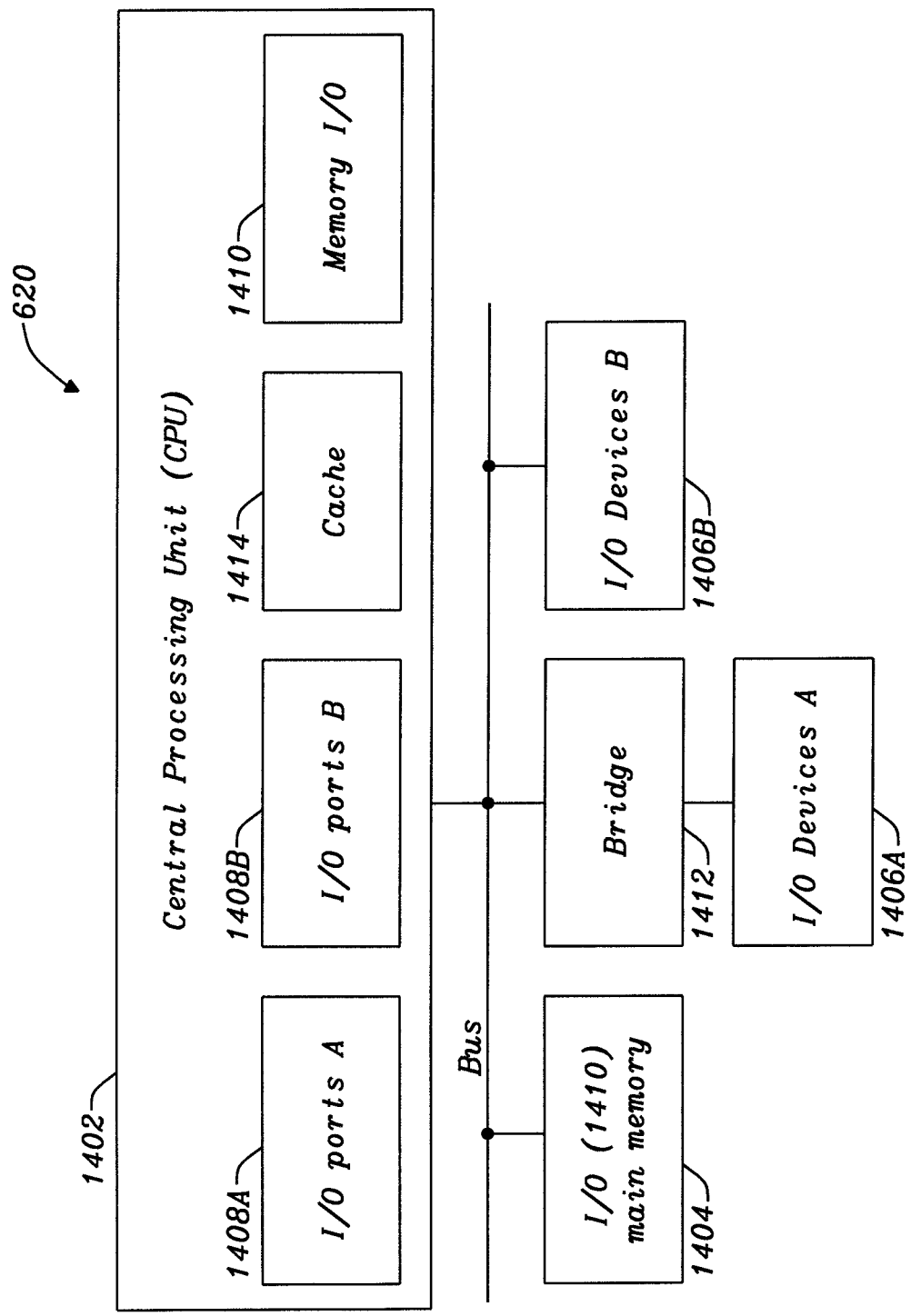

FIGS. 1A, B, C, and D schematically depict elements associated with a conventional 2D GUI that uses a 2D navigational device to maneuver a cursor;

FIGS. 2A, B, C, and D schematically depicts elements associated with the presently disclosed 3D GUI that uses a unique 3D navigational device to provide 3D motion vectors for an object by six degrees of freedom (DOF);

FIG. 3A schematically shows layers of the 3D GUI based on a windowing system, in which a specific GUI layer maybe positioned between the input device and the kernel of an operating system, designed for controlling user's viewing experience; several vendors in this market segment are also listed;

FIG. 3B schematically shows application interface (API) that bridges different types of input devices with the presently disclosed 3D GUI;

FIG. 3C schematically illustrates a hardware environment in which the 3D GUI of this disclosure operates.

Figure 4A:
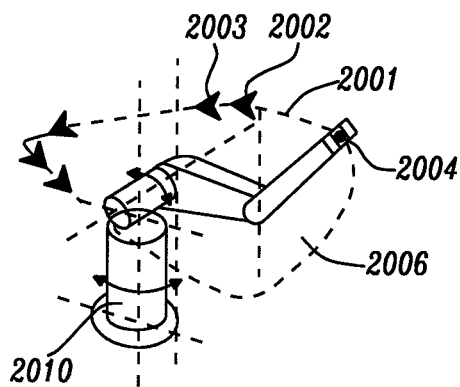
Figure 4B:
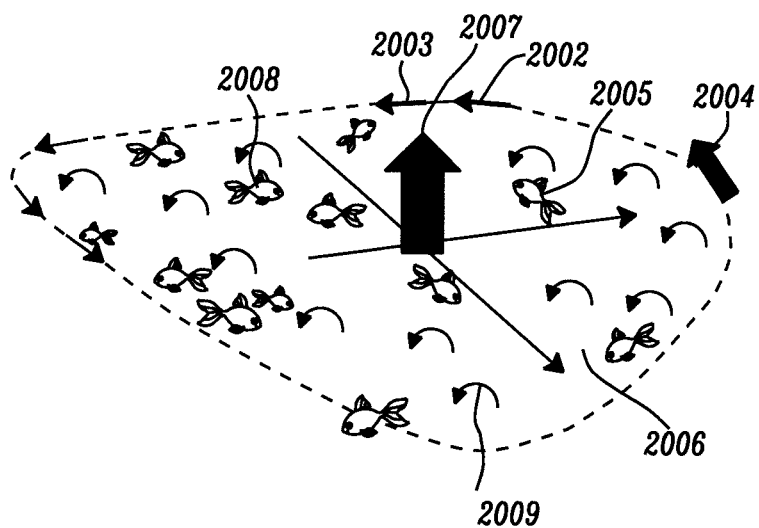

FIGS. 4A and 4B, schematically show how the presently disclosed 3D GUI adopts Stokes' theorem, such that physical parameters such as force, flow, and flux, etc., can be calculated.

Figure 5:
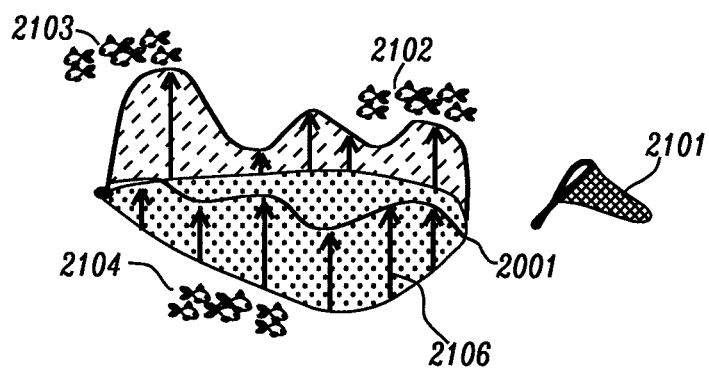

FIG. 5 schematically shows that a vector field can play a significant role when the presently disclosed 3D GUI uses Stokes' theorem to derive certain data using the vector cross product;

FIG. 6 schematically shows that the presently disclosed 3D GUI can collaborate with a 3D medical image (2201; e.g. Magnetic Resonance Imaging (MRI); Electrical Impedance Tomography (EIT), etc.) to assess certain health conditions pertaining to flux (e.g. blood stream) that prior art cannot match easily;

FIG. 7 schematically shows a method used by the conventional medical industry to indirectly suggest to the doctor how a blood stream flows through a vessel (2202) by the diameter of said vessel at different cross-sectional area; said method measures the diameter of the cross-sectional areas (e.g. 2305, 2306, 2307, 2309) of a few 2D medical images (i.e., 2301, 2302, 2303, and 2304);

FIG. 8 schematically depicts a distributed neural network that uses a plurality of computers to work with the presently disclosed 3D GUI, which is a package of software incorporated by the operating system of one of said computer comprising an internal software module (610), designed for processing the neural signals generated by said plurality of computers.

6. DETAILED DESCRIPTION

As stated above, the present disclosure describes a three-dimensional (3D) graphical user interface (3D GUI), of an electronic system, shown schematically in FIG. 2A as 207, that provides the absolute address and linear and non-linear motion vectors for a 3D object and which gives its user the extraordinary experience of engaging directly with that 3D object.

FIG. 3A shows a typical GUI in software layer formation, running on Hardware 620. Hardware 620 is further shown and described in FIG. 3C. As FIG. 3A shows, a GUI is a plurality of layers of software lying between the input devices (601) and the kernel (605) of an operating system (e.g. Windows, Linux, OS, Android); note that Microsoft Corp. refers to its operating system which comprises the Kernel 605 and GUI 207 as WINDOWS. In the generic definition of a GUI, a window is a region of a screen (i.e., 207) that is allocated to a specific application; a window manager (e.g. 604) is a system software that controls the placement and appearance of windows within a windowing system in a graphical user interface (e.g. 207). The typical types of window managers comprise the stacking type, tiling type, dynamic type, or the composite type. For the detailed characteristics of a GUI, readers may refer to the Wikipedia article titled "Graphical User Interface". Note that although conventional art tends to implement the above described layers of functions as software (e.g. 602, 603, and 604, of FIG. 4A), it does not rule out the possibility that a next generation 3D GUI (207) implements certain of these layers (i.e., internal process modules of FIG. 3B, such as Support Vector Machine 616, Neural Network 610, etc.) into hardware (e.g. Application Specific IC, ASIC).

Referring now more particularly to FIG. 3C, hardware 620 (as shown in FIG. 3A) is (as referred variously herein) a computer, display system, electronic system, or electromechanical system, or more generally for purposes of this disclosure—a computing device. The computing device typically includes a central processing unit (CPU) 1402, a main memory (1404), input/output devices (1406A/B), input/output ports (1408A/B), memory I/O (1410), a bridge (1412), and a cache memory (1414) in communication with the central processing unit 1402. The central processing unit (1402) is any logic circuitry that responds to and processes instructions received from the main memory (1410), and which reads and writes data to and from memory (1410). The main memory (1410) may include one or more memory chips capable of storing data and allowing any storage location to be directly accessed by the main processor (1402).

The graphical user interface of the disclosure is typically displayed on an I/O device (1406A) such as an electronic display. Input device 601 (from FIG. 3A) similarly is represented in FIG. 3C as another I/O device (1406B), which interacts with CPU (1402).

Recently, the growth of the entire GUI industry has slowed. Occasionally when a new input device was introduced to the market, the performance of the prior art GUI could be improved to some extent by using it; nevertheless, revolution has rarely been the case for the GUI industry. When the electronic industry entered the 3D graphics regime more fully in recent years, evangelists acclaimed that an upheaval of the electronic industry was imminent; in accord with that anticipation, new "gimmicky" devices, such as eye glasses embedded with a depth camera, virtual reality (VR) headsets, etc., emerged in the market. Unfortunately, as of yet the anticipated revolution has not occurred. In related application, Ser. No. 16/056,752, which is fully incorporated herein, we pointed out that some fundamental issues such as how a 3D GUI engages with a user in a comprehensive and realistic manner must be addressed before the anticipated revolution in the electronic industry can arrive. In that disclosure we introduced a 3D GUI that addressed those issues in a comprehensive manner. The present disclosure goes beyond what was described in NU17-001 and demonstrates that the 3D GUI can also include the functionality of vector fields and distributed neural networks.

6.1 Applying a 3D GUI to Vector Fields

In related application NU17-001 we have explained that the conventional GUI of the prior art treats pixels as mathematical points. Because points do not have any meaningful physical properties, a vector (i.e., an element in a vector algebra) does not have any significant role to play in the capabilities of the conventional (prior art) GUI. As a result, there is no vector field embedded in the conventional GUI and situations in which vector fields are involved cannot be dealt with using a conventional GUI. Referring now to FIG. 3B, a process module of vector field (617) is denoted as a separate layer of the presently disclosed 3D GUI (207)'s internal process modules (615).

In a realistic world, however, vector fields are found everywhere. For example, if a GUI is depicting a school of fish, then, from our common knowledge of nature, there should be water filling the space between each fish. To the viewer, water is an invisible object and a conventional GUI does not have to show its existence. But when the computer industry enters the realistic 3D graphic regime, a high-performance GUI must be able to demonstrate the existence of water by incorporating the effects of its vector field (i.e., flow velocity, pressure), such as showing how the gestures (i.e., physical appearance) of the fish are changing in accordance with the flow conditions of the water. Hence, a vector field is another feature that the presently disclosed 3D GUI can and should provide for the description of an object. Restrained by the original definition of mathematical points, a conventional GUI cannot designate any physical meaning (e.g. rotational motion vector of an object as small as a dot/point) to the objects it presents, let alone a vector field.

In vector calculus, Stokes' theorem (or law) denotes an integration of the differential forms on a manifold. Stokes' theorem (2) states that the integral of a differential form ω over the boundary of some smooth and orientable manifold Ω is equal to the integral of its exterior derivative dω over the whole Ω, i.e., $$\int_{\partial\Omega}\omega=\int_{\Omega}d\omega \tag{1}$$

More simply, Stokes' theorem provides a relationship between the surface integral of the curl of a vector field over a closed surface Σ in Euclidean three-dimensional space, and the line integral of the vector field around its boundary δΣ, i.e., $$\int\int_{\Sigma}\nabla\times F\cdot d\Sigma=\int_{\partial\Sigma}F\cdot dr \tag{2}$$

The line integral of the function is equal to the surface integral of its curl. In 3D space, The Divergence theorem, with an essential context similar to that of Stokes' theorem, provides a means of determining a three-dimensional volume integral (e.g. a rectangular volume 2201) by integrating over the two-dimensional surface(s) of said three-dimensional volume. Take FIG. 4A as an example. In this exemplary case, the position of a 3D cursor is denoted by a point (2004), which in reality is the end point of the arm of an imaginary robot that is presumed to be invisible to the user of the 3D GUI. Since the 3D GUI is able to provide translational and rotational motion vectors for the 3D cursor (2004), a 3D trajectory loop, dashed line (2001), can be constructed by the continual movement of the 3D cursor (2004). Upon continual movement of the 3D cursor, an area (2006) is enclosed by the 3D loop (2001; this loop can be denoted as a region of interest (ROI); in FIG. 6, a 3D array (2201) has similar characteristic, we will elaborate its utility in the latter paragraphs). Given this situation, now shown in FIG. 4B, a school of fish is positioned within said loop (2001 of FIG. 4A), each of which may swim in different directions and at different speeds. As FIG. 4B shows, fish (2008) is swimming toward the right, whereas fish (2005) is swimming toward the upper left. It may be acknowledged that all fish are all immersed in water without the viewer's perception of its existence. In FIG. 4B, the water is denoted by an enclosed area (2006) formed by the dashed line. As has been explained, water does not have any body formation that is visible to the viewer's eye, but its other physical properties, e.g. vector of flow, etc., do have significant influences on the motion of the fish. In addition, since water is a fluid, its flow condition in the interior region of the loop (2001) may vary from one place to another. FIG. 4B shows that one of these motions is denoted by a curved three-dimensional motion vector (2009). If a 3D GUI integrates the cross product of all said three-dimensional motion vectors within the 3D loop (2001), a total cross product of all the interior region motion vectors (heavy arrow 2007) confined in the area enclosed by said loop (2001) will be formed. This denotes that a main vector field (e.g. 2207) can be decomposed into several minor vector fields (e.g. 2209), and vice versa. Using Stokes' theorem, that combined cross product of all motion vectors (2007) can be derived by integrating the cross product of the motion vectors of said 3D cursor (2004) with a predefined vector field (e.g. a map of the water flow vector) along the loop (2001). Hence, as an operator is maneuvering said 3D cursor (2004) in the presently disclosed 3D GUI along a closed loop (2001), the magnitude of the vector field (i.e., water flow velocity) that is affected by said loop (2001) can be calculated. Thereafter, the 3D GUI can use this data to adjust the direction and/or speed of the fish within the loop.

FIG. 5 shows schematically how the 3D GUI can use artificial intelligence (AI) to engage with the user in an application environment that is filled with vector fields. In this exemplary case, the cursor (2101) literally becomes a net (and is pictured as such). When an operator moves that net (2101) along the loop (2001) to catch the fish (e.g. 2102, 2103, and 2104, etc.), by analyzing the motion vector of the cursor (2001), the fish are able to detect the changes of water flow and swim toward the direction pointing away from the net (2001). Mathematically, the fish make their decisions based on:
(i) motion vector of the net (2101) of FIG. 5, which can be denoted by a T matrix, i.e., see Eq. (3) in section 6.2 below;
(ii) flow of water (2106 in FIG. 5; note that arrow 2106 is used to denote the water flow vector);
(iii) locations of the other fish (some fish like to school together whenever they have the chance).

Thus, FIG. 3A, FIG. 3B and FIG. 3C, taken together, describes the complete hardware and software environment and functionalities of the present 3D GUI that is configured to assign vector field properties to the 3D space it is associated with. A great variety of industrial processes that use the laws of electromagnetism, heat transfer, diffusion in materials, etc., will find their respective applications enabled by said 3D GUI. Attention is advised that loop (2001), namely is an ROI in one dimensional formation; it denotes where said vector field (i.e., the water flow) has its validated influences on a fish; to a GUI designer, said loop (2001) acknowledges a computer where in a vector field has to be taken into account, as to the regions outside of said loop (2001), their vector fields are not considered influential to said fishes. In the following exemplary case (i.e., FIGS. 6 and 7), we will demonstrate that by designating a few ROIs in a 3D GUI affiliated with a vector field, one can greatly enhance the performance of the 3D GUI; the computer's calculating power, and its calculating time, will not be squandered on the irrelevant regions (i.e., outside of said ROIs). Still further, when the position, shape, and area enclosed by said ROI can be manipulated by the presently disclosed 3D GUI (207) in a real time manner, the performance of the presently disclosed 3D GUI (207) reaches an unprecedented level, this allows the presently disclosed 3D GUI (207) to serve in some technological terrains that have stringent requirement on performance (e.g. medical image processes, etc.).

FIG. 6 shows how the presently disclosed 3D GUI deals with a possible 3D medical image (2201). In a rectangular volume denoted by a possible 3D array (2201) of medical imaging data (e.g. Functional Magnetic Resonance Imaging, (fMRI); Electrical Impedance Tomography (EIT), etc.), a segment of blood vessel (2202) is immersed in that 3D array (2201), taking an influx of blood at a flow rate of $Q_{influx}$ from its bottom cross section (2208). In the meantime, the blood vessel (2202) is ejecting blood from its two upper cross sections, (2204) and (2205), at the flow rates of $Q_{outflux1}$ and $Q_{outflux2}$, respectively. There are two ways to assess the flowing condition of said blood vessel (2202):
(i) As FIG. 7 shows, measuring the diameter of the cross-sectional areas (e.g. 2305, 2306, 2307, and 2308) in a few 2D medical images (i.e., 2301, 2302, 2303, and 2304) can indirectly reveal the condition as how the blood stream flows through said vessel 2202);
(ii) Use the presently disclosed 3D navigational device to draw a few cross-sectional circles (i.e., 2211, 2208, and 2209) in the 3D medical image (2201), whose diameters can be arbitrary, but are preferably slightly larger than the diameter of the blood vessel (2202) (in FIG. 6). Using Stokes' theorem, the presently disclosed 3D GUI can calculate the cross product for all elements of said 3D medical image array (2201) enclosed by said circles. Note that, generally, within the enclosed area, only the elements within said blood vessel (2202) will carry the flow rate information in a formation of a vector field; the elements outside of said blood vessel (2202) may also constitute a minor vector field, but they will make very little contribution to the final result of the calculation process of the cross product. Hence, the presently disclosed 3D GUI provides an unprecedented methodology to extract the flow rate information from a 3D medical image.

Readers are advised that there are many ways to determine a vector field in a medium (e.g. an indirect, non-mechanical, or even non-invasive means, etc.). For example, when a medium is subjected to an electromagnetic field (e.g. a microwave, whose characteristic such as its intensity may vary over time), the flowing condition of the electrical current in said medium can be denoted by the variations of its dielectric constant. From a physical point of view, the flowing condition of the electrical current denotes the kinematics of the charged particles contained by a specific region (i.e., the subject medium), and the motion vectors of said charged particles are subjected to their interactions with the vector field, i.e., microwave. In the medical industry, microwaves have been implemented on the Electrical Impedance Tomography (EIT) and many other applications. In recent decades, the changes in the dielectric properties of the tissues caused by various physiological and pathological alterations have been studied quite intensively (e.g. breast tissues, liver tissues, lung tissues, blood perfusion and malignancy, brain imaging, and cardiac imaging, etc.). Meanwhile, despite the significant progress achieved by the latest diagnosing technology such as EIT, state of art medical industry still lacks an effective and comprehensive means to manipulate a pixel/voxel in a medical image (e.g. EIT, etc.) by six degrees of freedom. In medical industry, there are the anatomical imaging techniques such as the computed tomography (CT) and magnetic resonance imaging (MRI), that can be configured to depict the three-dimensional morphology of a subject (e.g. a stack of CTs taken on an ROI, each of which denotes a specific CT on a position departed from the neighboring one by a predetermined distance), and there are the functional medical imaging techniques such as positron emission tomography (PET), functional MRI (fMRI) and magnetoencephalography (MEG), that can be configured to present four-dimensional (e.g. x, y, z, time; if characterized by the means of data acquisition, spatial-temporal, spatial-spectral) information pertaining to the metabolism of an underlying anatomy. Still further, the electrical impedance tomography (EIT) is an imaging technique configured to collect five-dimensional (e.g. x, y, z, time, and RF frequency; if characterized by the means of data acquisition, spatial-temporal-spectral) impedance variation data using a spectroscopic EIT system over a specific time interval. Note that none of the above stated techniques can provide a medical image signal by six, or even higher, degrees of freedom. As has been disclosed in NU17-001, the presently disclosed 3D GUI (207) provides an extraordinary means by which to manipulate a basic entity of a GUI (e.g. a pixel/voxel) by six, or more, degrees of freedom. In the present disclosure, said 3D GUI (207) provides further more degrees of freedom for said pixel/voxel by a plurality of vector fields. For example, in order to assess a complicated situation in a soft tissue (e.g. the flowing condition of blood in a region of ischemia, which can be denoted by the 3D zone 2201 of FIG. 6), the presently disclosed 3D GUI (207) may use a plurality of vector fields (e.g. blood streams, profile of pressure gradient, concentration of oxygen, or shear stress on the wall of a vessel, etc.) to simulate a realistic situation in human body. As such, the dimension of said vector fields provide each pixel/voxel in an image with more degrees of freedoms. The difference between NU17-001 and NU17-003 lies on their respective means of manipulating said degrees of freedom, wherein NU17-001 relies on a 3D navigational device (202) to achieve the goal, the presently disclosed NU17-003 relies on applying Stokes' theorem/Divergent theorem on a designated ROI (region of interest) to achieve its goal.

Designating the position, shape, and size of a specific ROI, namely the 3D array (2201) of FIG. 6, provides the presently disclosed 3D GUI (207) with an unprecedented means of confining the total dimension of a to-be-analyzed medical image within a reasonable range (saving process time for a diagnosing system, as well), this is a unique feature of the presently disclosed 3D GUI (207) that other prior arts cannot match easily. When the position, shape, and size of an ROI can be manipulated by an operator by six degrees of freedom based on one gestural motion of an operator's hand holding the navigational device (202), it denotes an unprecedented user engaging experience that prior art cannot match easily. When the position of an object (e.g. a soft tissue) in the presently disclosed 3D GUI (207) can be manipulated at a consistently accurate level (i.e., it does not suffer from any continual degradation problem that happened on the conventional relative motion detection device; this issue has been elaborated in section 6.4 of NU17-001), it denotes that the presently disclosed 3D GUI (207) can be used by the medical/industrial applications as a pervasive technological solution for maneuvering an object that may appear in different modes of images (e.g. MRI, CT, ultrasonic, EIT, etc.) simultaneously. In essence, the presently disclosed 3D GUI (207) bears the fundamental capability to meet the challenges of next generation medical/industrial imaging science; it is able to perform an image analysis at an unprecedently high dimension on each pixel/voxel (e.g. dimension >=6, etc.), whereas the total dimension of the pixels/voxels in the ROI is still controllable to reasonable range, allowing for an operator to interact with an object contained therein in real-time, in-situ manner.

As one may understand from the above explanation, in order to process a multidimensional tomographic dataset effectively and efficiently, a computer would prefer to register more than one ROI in one GUI concurrently; in order to perform a cross referencing analysis on said ROIs, the positional data of the objects in said ROIs are desired to be aligned to one another. So, providing a means for an operator to manipulate the position/dimension/shape of an ROI not only helps confine the total dimension of the image to be analyzed, but also helps extracting information from a plurality of images reliably. As has been disclosed in section 6.3 of NU17-001, the presently disclosed 3D GUI (207) can engage with a plurality of 3D objects enclosed by a 3D volume that is designated by its operator (i.e., 501B of FIG. 5B of NU17-001), wherein the shape and dimension of said 3D volume(s) can be manipulated by a unique 3D navigational device (202) by six degrees of freedom, and the positional data provided by said 3D navigational device (202) can be set at an absolute addressing mode, which helps maintaining its accuracy through an extended length of maneuvering.

We now come to a realization that the above stated 3D volume (501B) of NU17-001 is in effect the 3D array (2201) of the presently disclosed GUI, and based on this ratiocination, our knowledge on the Stokes' theorem can be extended to the Divergence theorem, which relates a three dimensional volume integral (e.g. the rectangular volume 2201) to two dimensional surface (e.g. the six surfaces of said rectangular volume 2201) integrals on the boundaries of said volume. In practice, this denotes that a full-fledged 3D medical/industrial GUI may take two steps to assess the influence of a vector field: first, it may designate a 3D ROI for performing a 3D vector field analysis using the 2D boundary surfaces that enclose said ROI, thereafter the 3D medical/industrial GUI may take the second step to designate a few one dimensional features, e.g. loops, on said 2D boundary surfaces; using the presently disclosed navigational device (202), said operator can adjust a property of said vector field contained by said 3D ROI by manipulating the position, length, shape, and area enclosed of said loops. In many applications, the above stated steps can be implemented as the tools/icons of a 3D GUI (207).

The above stated full-fledged 3D medical/industrial GUI (207) may further use an artificial intelligence feature (i.e., module 610 of FIG. 3B) to predict a situation based on the knowledge it learned from the images acquired before. Sometimes a predicting/learning process as such may involve multiple modes of images. For more detailed process of visualizing multiple modes of medical images, one may refer to an exemplary case: "Visualization of multidimensional and multimodal tomographic medical imaging data, a case study", YAN ZHANG et al, Philosophical Transactions of the Royal Society A, (2009) 367, 3121-3148. Meanwhile, despite its impressive result, the dimension of the medical images used by YAN is still quite limited (i.e., three or four)—it does not provide any means for a computer to combine a graphical vector in said medical images to a motion vectors generated by a vector field to form a new kind of feature vector in a higher dimensional space. In NU17-002, such kind of feature vectors can be classified by an artificial intelligence process for learning/predicting process use, this unique feature may help a medical doctor identify certain complicated syndromes at the incipient stage. In both NU17-001 and 17-002, SVM (support vector machine, 616) and CNN (convolutional neural network, 610) have been fully disclosed as two internal process modules incorporated by the presently disclosed 3D GUI (207) for performing the AI processes like the above; their essential characteristics have been disclosed in the respective sections (i.e., section 6.7 of NU17-001 and section 6.2 of NU17-002, etc.).

State of art artificial intelligence-provided medical imaging processing technology suffers from two generic problems. First, different modes of images are difficult to derive a common ground truth without any bias; secondly, a prediction made by artificial intelligence-provided medical image processing technology still requires an expert to scrutinize the associated data (e.g. a stack of DICOM images) in order to make sure the decision as-made is accurate and reliable, and this process usually requires a lot of manpower. Note that human eyes are a high caliber neural network; the human eye can understand a 3D scenery by projecting it to a 2.5D coordinate system. In NU17-002, we have disclosed that presenting a 3D image by 2.5D perspective sketching technique (i.e., using the internal process module 607) has the merit of converging the degree of freedoms of certain graphical vectors contained therein to its vanishing point. By manipulating a perspective angle, the sensation of three dimension of a 2.5D graphic can be adjusted. From artificial intelligence point of view, the vanishing point(s) and vanishing line(s) in a perspective sketch bears the merit to "regulate" the apparent degrees of freedom of a 2.5D image; this explains why a perspective sketch having a plurality vanishing points/lines therein may provide a stronger sensation of three-dimension than the ones that don't have any vanishing point/line, and the overall looking of said perspective sketch having a plurality vanishing points/lines is neater than the ones that don't have any such features. From artificial intelligence point of view, the above unique characteristic denotes that a perspective sketch provides more ground truth information for the viewer. Thus, although a final sketch that contains nothing but the ground truth information may still be hard to found out by the state of art image processing technology, as the teachings provided by NU17-002 have disclosed, adding a few vanishing points/lines to an image would make the inference made by an artificial intelligence feature closer to the ground truth as compared to those of the ones having no vanishing point/line. A medical image having its key feature vectors being "regulated" by several vanishing points/lines may also help an expert scrutinize said image more efficiently and effectively, which in return saves a lot of manpower and time on checking the accuracy and reliability of the decision made by an artificial intelligence feature.

6.2 Distributed Neural Network 3D GUI

This section will refer briefly to section 6.7 of related application, Ser. No. 16/056,752 in which Eq. (15) describes a T matrix that generates the motion of a robotic arm such as FIG. 4A. For convenience, we show Eq. (15) below correctly numbered as (3):

$$T_0^i = {}^0A_1 \cdot {}^1A_2 \cdot {}^2A_3 \cdot {}^3A_4 \ldots = \prod_{j=1}^{i} {}^{j-1}A_j = \begin{bmatrix} R_{11} & R_{12} & R_{13} & X \\ R_{21} & R_{22} & R_{23} & Y \\ R_{31} & R_{32} & R_{33} & Z \\ 0 & 0 & 0 & 1 \end{bmatrix};$$

for $i = 1, 2, \ldots n$ (3)

The purpose of that section is to show how robot kinematics can be functionally generated by simple matrices that contain in them the linear and rotational motions of a complex system that produce the resulting motion of one point on that system, in that case the tip of the robotic arm. In this section, we show how that method of generating robotic kinematics can also be applied to simplify and make comprehensible the functioning of a distributed neural network. FIG. 8 shows a distributed network (2400). In this distributed network (2400), the presently disclosed 3D GUI is interacting with a plurality of computers. As FIG. 8 further shows, a 3D object is denoted schematically (as an example) by a flying carpet (2408). The flying carpet (2408) not only can fly in a 3D virtual world defined by one particular computer (e.g. 2405), but also through the virtual world comprising a network of several other computers (e.g. 2401, 2402, 2403, 2404, 2405, and 2406, etc.). In other words, the flying carpet (2408) is interacting with a large set of data represented by a network having a variable numbers of nodes (i.e., a network whose size may be constantly changing over time). As FIG. 8 further shows, when the flying carpet (2408) passes through one of said computers, it is subjected to the influences of a motion vector denoted as $^{n-1}A_n$, which is in fact a matrix having an exemplary format depicted by the T-matrix of Eq. (3) above. Thereafter, the position and gestures (appearance) of said flying carpet (2408) will be changed accordingly (i.e., as some elements of the matrix $^{n-1}A_n$, have been changed). In reality, the flying carpet (2408) may be a node of a neural network (possibly comprising a multiplicity of networked computers) without having a specific visualization in a particular displaying device. Thus, as it flies through them, the node (carpet) may evaluate the stimuli generated by several different neural cells (e.g. 2401, 2402, 2403, 2404, 2405, and 2406, etc.) concurrently. The interaction among the stimuli of this neural network can be quite complicated so that an ordinary data analysis program dedicated to any one computer may not have sufficient time or suitable capabilities to evaluate so many situations. Nevertheless, the teachings in section 6.7 of related application herein fully incorporated by reference (i.e., embedded robot kinematics in the present 3D GUI) provides a reasonable background capability for a device engineer to assess the situation in a structured manner. When the status of an object is coded in a more structured manner, the associated event languages (e.g. Microsoft Visual Basic, C++, etc.) can be written, executed, and debugged more easily. As Eq. (15) shows, there are several elements in matrix R that have more to do with the linear/translational motions (i.e., $R_{11}$, $R_{22}$, and $R_{33}$), and there are other elements that have more to do with the nonlinear/rotational motions (i.e., $R_{12}$, $R_{13}$, $R_{21}$, $R_{23}$, $R_{31}$, and $R_{32}$). When the interaction among the neural nodes are more complicated, the dimension of said matrix R of Eq. (15) still can be increased (i.e., >3×3). But that usually is not necessary; to simplify a case, one can use a multiplying process of a plurality matrix (e.g. 3×3, or 4×4, if the additional element of value 1 is added to the last element of said matrix R) to denote a complicated situation. For example, when said flying carpet (2408) goes through different computers, or via different trajectories (e.g. a path described by a unique processing sequence of said computers, such as: first 2405, then 2404, then 2403, then 2402, and then 2401, etc.), the final influence of said $^{n-1}A_n$ on flying carpet (2408) may vary significantly.

In FIG. 3B, the presently disclosed 3D GUI includes a processing module for a neural network (610), thereby the performance of said flying carpet (2408), which is essentially the output of a node of that distributed neural network (2400), can be determined in a systematic manner. This is demonstrated by FIG. 3B as follows.

Referring again to FIG. 3B, the presently disclosed 3D GUI communicates with a plurality of input device(s) through an API (609); through that API (609), linear and nonlinear motion vectors (i.e., 612, 613) can be fed into the neural network module (610) quickly and easily, making the presently disclosed 3D GUI highly responsive and user engaging. We note for clarity and to indicate the larger hardware context in which the 3D GUI operates (FIG. 3C), that, as shown schematically in FIG. 3C, the 3D GUI of the disclosure is typically displayed on an I/O device 1406A such as an electronic display. Input device 601 (from FIG. 3A) similarly is represented in FIG. 9 as another I/O device, either 1406A or 1408B, which interacts with main processor 1402.

Occasionally, the distributed neural network (2400) may have a designated cluster center (2407), such that the associated neural stimuli generated by different neural cells (e.g. 2401, 2402, 2403, 2404, 2405, and 2406, etc.) can all be sent to that cluster center (2407), forming a unique T matrix in accordance with a predetermined matrix multiplying process (again, see NU17-001 for details). This T matrix embodies result of the set of operations that have been sent to the cluster center from the operations that were performed separately by the individual neural cells. The calculated result of that T matrix can be used to process many application situations whose results could hardly be achieved by a stand-alone computer by itself, dealing with a single neural cell at a time. Supported by the cluster center (2407), the users' viewing experience and sense of engagement with the distributed neural network (2400) can be further enhanced, or be managed in a timely manner.

As is understood by a person skilled in the art, the sections of the present disclosure are illustrative of the present disclosure rather than being limiting of the present disclosure. Revisions and modifications may be made to methods, processes, materials, structures, and dimensions through which is made and used a 3D GUI that imparts linear and nonlinear motion vectors corresponding to different degrees of freedom of a 3-dimensional object to its basic graphical elements, such as pixels, voxels, and includes functionality for applying vector field analysis and neural networks, while still providing such methods, processes, materials, structures and dimensions in accordance with the present disclosure as defined by the appended claims.

I claim:

1. A system comprising:
a main memory and at least one processor coupled to said main memory, said processor being in a computer, a display system, an electronic system, or an electromechanical system, said system being configured to present on a display device a three-dimensional graphical user interface (3D GUI);
wherein said 3D GUI is configured to allow an object to be maneuvered in a 3D space represented by and displayed in said 3D GUI, said maneuvering being represented by a motion of said object having at least three independent degrees of freedom, said motion being characterized by either linear or non-linear motion vectors, or both;
wherein said linear and non-linear motion vectors represent translational and rotational motion respectively of said object and are generated by a single gestural motion of a navigational device on a reference surface without applying the input of other motion detection devices; and wherein
said 3D space contains a plurality of vector field(s).

2. The system of claim 1, wherein at least one of said plurality of vector fields is time dependent and is configured to interact with a plurality of real or virtual 3D objects and thereby affects kinematics of said plurality of 3D objects; wherein at least one said motion vector of said real or virtual 3D objects is provided by and/or is manipulated by said navigational device, wherein said interaction thereby creates a new motion vector for at least one of said real or virtual 3D objects, or creates a new 3D object having a motion vector, wherein a magnitude and directionality of said new motion vector is different from those not generated by said interaction.

3. The system of claim 2 wherein said new motion vector includes the results of the interactions with a vector field that describes a physical flow and wherein said new motion vector characterizes the motion of a physical body that is immersed in said physical flow.

4. The system of claim 3 wherein said physical flow is constrained to the interior of a set of continuous enclosed channels and wherein said physical flow is continuous through said channels and wherein said physical flow is described by a vector field that satisfies Stokes' law and/or the divergence theorem.

5. The system of claim 4 wherein a cursor generated by said 3D GUI traverses a periphery of a two-dimensional (2D) cross-section of said continuous enclosed channels and wherein said vector field is defined along said periphery and is also defined within the interior of said 2D cross-section bounded by said periphery and wherein the motion of said cursor is along a closed curve traversing said periphery and thereby defines a line integral of said vector field along said periphery and wherein, by application of said Stokes' law when said line integral traverses the entire closed curve along said periphery, values of said vector field within the interior of said periphery are obtained.

6. The system of claim 4 wherein said channels represent a section of a vein, artery, or a cardiovascular lumen, wherein said physical flow is a flow of blood or lymph through said vein, artery, or lumen and wherein said system is configured to present a plurality of data in a form of physical data generated by a magnetic resonance imaging (MRI) sequence, CT sequence, Electrical Impedance Tomography (EIT) sequence, ultrasonic image sequence, or a computer simulation program that is configured to generate one of the above sequences.

7. The system of claim 3 wherein said physical flow is along a pathway that need not be fully enclosed and wherein properties and affects of said physical flow are defined by vector fields that obeys Stokes' law and the divergence theorem.

8. The system of claim 1, wherein at least one of said plurality of vector fields is characterized by and manipulated by a mouse, keyboard, console, or other data inputting device throughout a three-dimensional region of interest (ROI), wherein a contour of said ROI is defined by a plurality of two-dimensional boundary surfaces, wherein at least one property of said at least one of said plurality of vector fields can be changed by a manipulative action on one of said two-dimensional boundary surfaces, wherein said manipulative action can be denoted by a motion vector having at least three independent degrees of freedom.

9. The system of claim 8, wherein said at least one property of said vector field within said ROI can be manipulated by said navigational device by designating or manipulating a one-dimensional loop on said two-dimensional boundary surface.

10. The system of claim 1, wherein said 3D GUI determines a status of a process by classifying a plurality of neural signals derived from a plurality of different modes of production of images, or by said plurality of neural signals, i.e., vectors derived from said plurality of vector field(s), or both.

11. The system of claim 10, wherein at least one of said different modes of image production is four-dimensional, wherein said four-dimensionality includes spatial-temporal or spatial-spectral dimensions, or five-dimensional, wherein said five-dimensionality includes spatial-temporal-spectral dimensions, or of an even higher dimensionality.

12. The system of claim 10, wherein said at least one of said neural signals is manipulated by said navigation device by at least three degrees of freedom.

13. The system of claim 1 further comprising a layered configuration of separate software modules that are loaded into said main memory and separately dedicated to providing pervasive processing functionalities for, at least, artificial intelligence (AI) operations, robotic kinematics, vector field interactions, neural networks of various forms, full support of 3D vector graphics and operations requiring visual perspective, wherein said software modules act separately or in an interactive manner.

14. The system of claim 13 wherein a plurality of vanishing point(s) is (are) used by one of said processing software modules, thereby providing perspective as a means of controlling apparent degrees of freedom of feature vectors contained therein.

15. The system of claim 14, wherein a total dimension of said feature vectors processed by a neural network process module contained within said 3D GUI is controlled by the position, size, and contour of a ROI.

16. The system of claim 13, wherein said software module providing processing of neural networks comprises support vector machine (SVM) processing, convolutional neural network (CNN) processing, graphic-aware neural network (GNN) processing or other AI capabilities providing equivalent effects.

17. The system of claim 13 wherein, when said neural network module is used to make inferences by applying successive variations to an image perspective and when such inferences made by said neural network module approach closer to a ground truth, e.g., when a bias of said inference made on successive images is reduced when said neural network module applies said perspective module to infer a new image viewed from a new perspective angle, the formation of said new perspective angle is controllable by said 3D GUI, or by an operator of said system, and said approach to a ground truth is thereby also controllable.

18. The system of claim 13 wherein said 3D GUI is configured to interact with a user by means of a distributed neural network in which said 3D GUI is a network node, wherein at least one neural signal generated by said distributed neural network is generated by motions of said navigational device communicating with said 3D GUI by providing to said distributed neural network a set of input data having more than three degrees of freedom and decomposable into linear and non-linear subsets.

19. The system of claim 18 wherein said neural signals are processed as a formation of matrix elements in the form of a T matrix by said distributed neural network, and wherein said at least one said neural signal is generated by said gestural motion of said navigation device having more than three degrees of freedom.

20. The system of claim 19 wherein said T matrix is stored in a central cluster of nodes of said distributed neural network, wherein said central cluster of nodes stores and provides an actionable form of said T matrix, representing in operational form the results of a total process sequence comprising sequential neural activities of individual neural cells.

* * * * *